(12) United States Patent
Jankowski

(10) Patent No.: US 11,239,750 B2
(45) Date of Patent: Feb. 1, 2022

(54) CHARGE PUMP CIRCUITS

(71) Applicant: TEXAS INSTRUMENTS INCORPORATED, Dallas, TX (US)

(72) Inventor: Maciej Piotr Jankowski, Munich (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/030,668

(22) Filed: Sep. 24, 2020

(65) Prior Publication Data

US 2021/0013800 A1  Jan. 14, 2021

Related U.S. Application Data

(63) Continuation of application No. 16/663,481, filed on Oct. 25, 2019, now Pat. No. 10,826,388.

(60) Provisional application No. 62/777,987, filed on Dec. 11, 2018.

(51) Int. Cl.
*H02M 3/07* (2006.01)

(52) U.S. Cl.
CPC ............. *H02M 3/07* (2013.01); *H02M 3/073* (2013.01); *H02M 3/072* (2021.05)

(58) Field of Classification Search
None
See application file for complete search history.

(56) References Cited

U.S. PATENT DOCUMENTS

| | | | |
|---|---|---|---|
| 5,642,072 A | 6/1997 | Miyamoto | |
| 5,818,290 A * | 10/1998 | Tsukada | G05F 3/205 327/537 |
| 5,940,283 A | 8/1999 | Mihara | |
| 6,137,374 A | 10/2000 | Merrill | |
| 6,246,280 B1 | 6/2001 | Morishita | |
| 6,741,118 B2 | 5/2004 | Uchikoba | |
| 7,119,604 B2 | 10/2006 | Chih | |
| 7,502,264 B2 | 3/2009 | Rodgers, III | |
| 7,888,989 B2 * | 2/2011 | Lin | H02M 3/07 327/536 |
| 7,956,675 B2 * | 6/2011 | Saitoh | H02M 3/073 327/536 |
| 8,111,006 B2 | 2/2012 | Komiya | |
| 8,692,608 B2 | 4/2014 | Chen | |
| 9,281,744 B2 | 3/2016 | Kropfitsch | |
| 9,639,133 B2 | 5/2017 | Shor | |
| 9,843,256 B2 | 12/2017 | Um | |
| 10,340,793 B1 * | 7/2019 | Tang | H03K 19/0948 |
| 2009/0243706 A1 | 10/2009 | Hsueh | |

* cited by examiner

*Primary Examiner* — Thomas J. Hiltunen
(74) *Attorney, Agent, or Firm* — Valerie M. Davis; Charles A. Brill; Frank D. Cimino

(57) ABSTRACT

A charge pump circuit includes a voltage output terminal, a flying capacitor, and a current source. The flying capacitor includes a first terminal coupled to the voltage output terminal, and a second terminal coupled to an output terminal of a drive circuit. The current source includes a first terminal coupled to the voltage output terminal, and a second terminal coupled to a power supply rail.

22 Claims, 5 Drawing Sheets

CHARGE PUMP CIRCUITS

CROSS-REFERENCE TO RELATED APPLICATIONS

This continuation application claims priority to U.S. patent application Ser. No. 16/663,481, filed Oct. 25, 2019, which claims the benefit of and priority to U.S. Provisional Patent Application No. 62/777,987, filed Dec. 11, 2018, both of which are incorporated herein by reference in their entirety.

BACKGROUND

Many electronic circuits apply multiple power supply voltages. In cases where a power supply voltage is lightly loaded, a charge pump circuit may be used to generate the voltage. For example, in a circuit that applies a positive power supply voltage and a negative power supply voltage, a charge pump circuit may used to generate the negative power supply voltage from the positive power supply voltage when the negative power supply voltage is lightly loaded. Charge pump circuits use switched capacitors to convert an input voltage to an output voltage that may be higher than, or negative relative to, the input voltage. In a charge pump circuit, switches coupled to a capacitor are operated in sequence to first charge the capacitor from the input voltage and then transfer the charge to the output.

SUMMARY

A charge pump circuit that includes regulation using forward and reverse currents is disclosed herein. In one example, a charge pump circuit includes a voltage output terminal, a flying capacitor, and a current source. The flying capacitor includes a first terminal coupled to the voltage output terminal, and a second terminal coupled to an output terminal of a drive circuit. The current source includes a first terminal coupled to the voltage output terminal, and a second terminal coupled to a power supply rail.

In another example, a charge pump circuit includes a voltage output terminal, a voltage inverter circuit, and a current source. The voltage inverter circuit is coupled to the voltage output terminal and is configured to generate a negative voltage at the voltage output terminal. The current source is coupled to the voltage output terminal and is configured to increase a voltage at the voltage output terminal responsive to the voltage at the voltage output terminal being less than the negative voltage generated by the voltage inverter circuit.

In a further example, an electronic circuit includes an input terminal, an analog front-end circuit. The analog front-end circuit is coupled to the input terminal, and includes a chopper circuit and a charge pump circuit. The charge pump circuit includes a voltage output terminal, a flying capacitor, and a current source. The voltage output terminal is coupled to the input terminal and the chopper circuit. The flying capacitor includes a first terminal coupled to the voltage output terminal, and a second terminal coupled to an output terminal of a drive circuit. The current source includes a first terminal coupled to the voltage output terminal, and a second terminal coupled to a power supply rail.

BRIEF DESCRIPTION OF THE DRAWINGS

For a detailed description of various examples, reference will now be made to the accompanying drawings in which.

DETAILED DESCRIPTION

In this description, the term "couple" or "couples" means either an indirect or direct wired or wireless connection. Thus, if a first device couples to a second device, that connection may be through a direct connection or through an indirect connection via other devices and connections. Also, in this description, the recitation "based on" means "based at least in part on." Therefore, if X is based on Y, then X may be a function of Y and any number of other factors.

Some charge pump circuits have no current capability or have high output resistance in the direction of reverse current flow. For example, a charge pump circuit that provides negative output voltage may be unable to source current. Consequently, such charge pump circuits may be intolerant to excess voltage arising from external sources. Excess voltage may damage the charge pump circuit or circuitry powered by the charge pump circuit.

The charge pump circuits disclosed herein include circuitry for regulating the voltage at the output of the charge pump circuit to prevent overvoltage or undervoltage caused by external circuitry. Charge pump circuit implementations include a voltage inverting circuit to generate a negative voltage and current source that passes a current to the output of the charge pump circuit when voltage at the output falls below a desired voltage. The current source and the voltage inverting circuit are controlled by a control circuit (e.g., a class B or class AB control circuit) that receives output voltage error information from an error amplifier. The charge pump circuits of the present disclosure do not require Zener diodes (which are not available in all semiconductor processes) for protection or voltage regulation, and are suitable for use with high-impedance analog inputs.

Figure 1:
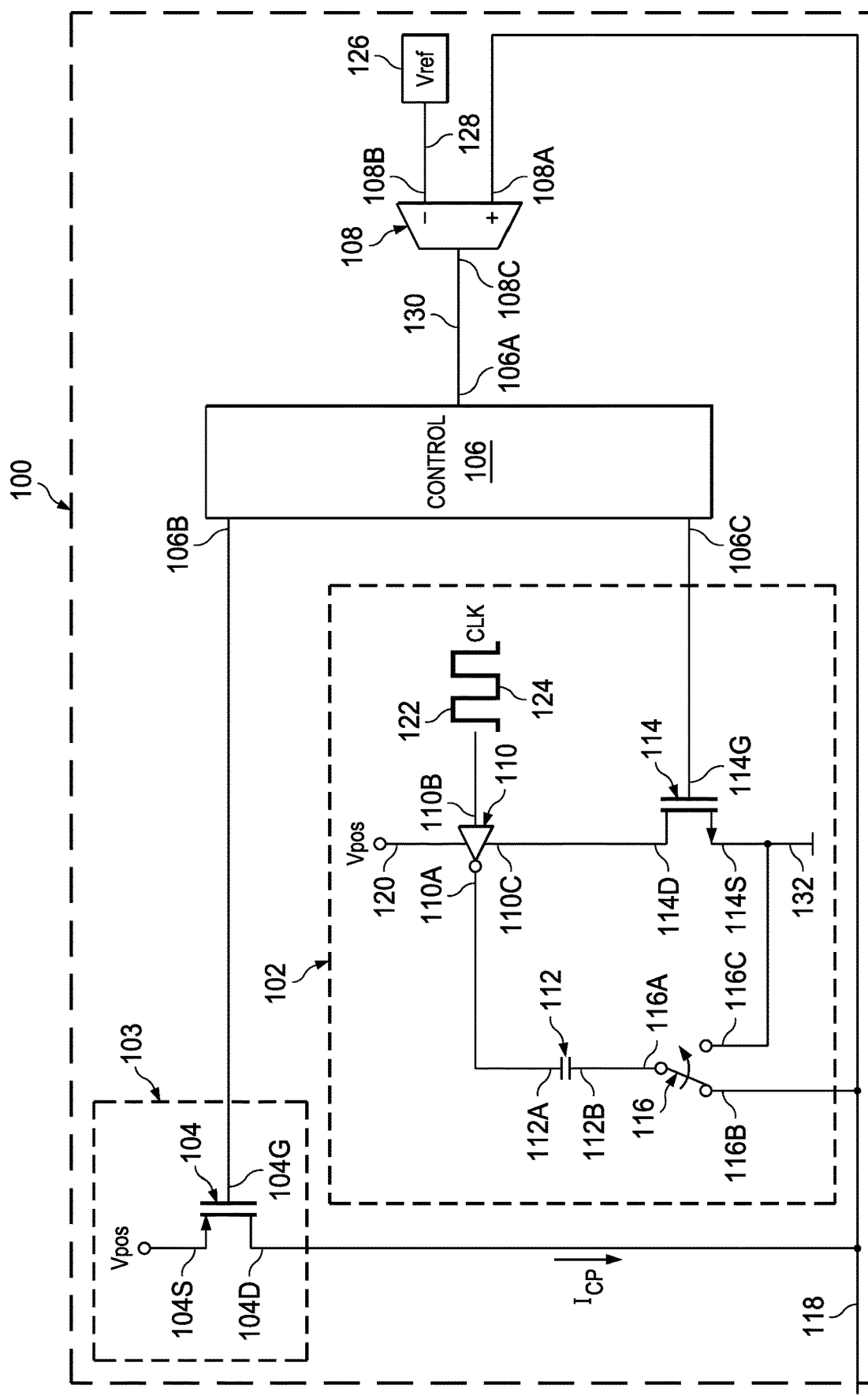
FIG. 1 shows a schematic diagram for an example charge pump circuit with undervoltage regulation in accordance with this description.

FIG. 1 shows a schematic diagram for an example charge pump circuit 100 with overvoltage regulation in accordance with this description. The charge pump circuit 100 includes a voltage inverter circuit 102, a current source 103, a control circuit 106, an error amplifier 108, and a voltage output terminal 118. The voltage inverter circuit 102 is coupled to the voltage output terminal 118 and the control circuit 106, and generates a negative voltage at the voltage output terminal 118 based on a positive voltage provided at the power supply rail 120. For example, if +3.3 volts is provided at the power supply rail 120, then the voltage inverter circuit 102 provides −3.3 volts (approximately) at the voltage output terminal 118.

The voltage inverter circuit 102 includes a driver circuit 110, a flying capacitor 112, a transistor 114, and a switch 116. An input terminal 1106 of the driver circuit 110 is coupled to a clock source (e.g., an oscillator circuit), and an output terminal 110A of the driver circuit 110 is coupled to a terminal 112A of the flying capacitor 112. The driver circuit 110 charges the flying capacitor 112 by driving the voltage provided at the power supply rail 120 onto the terminal 112A during a first part 124 of a clock cycle, and connects the terminal 112A to the drain terminal 114D of the transistor 114 during a second part 122 of the clock cycle.

The flying capacitor 112 is coupled to the voltage output terminal 118 and to a ground rail 132 via the switch 116. The ground rail 132 is a power supply rail coupled to a common voltage source. The switch 116 includes a terminal 116A coupled to a terminal 112B of the flying capacitor 112, a terminal 116B coupled to the voltage output terminal 118, and a terminal 116C coupled to the ground rail 132. The switch 116 may be implemented as two switches disposed in parallel. In the first part 124 of the clock cycle, the switch 116 connects the terminal 1126 of the flying capacitor 112 to the ground rail 132 for charging, and in the second part 122 of the clock cycle the switch 116 connects the terminal 112B of the flying capacitor 112 to the voltage output terminal 118 for provision of the negative voltage.

The transistor 114 is coupled to the driver circuit 110 and the control circuit 106. The transistor 114 controls connection of the driver circuit 110 to the ground rail 132, and thereby controls the charge transferred from the flying capacitor 112 to the voltage output terminal 118. For example, turning the transistor 114 on harder results in transfer of more charge from the voltage output terminal 118 to the flying capacitor 112. The transistor 114 is an N-channel metal oxide semiconductor field effect transistor (MOSFET) in some implementations of the charge pump circuit 100. The transistor 114 includes a drain terminal 114D coupled to a common terminal 110C of the driver circuit 110, and a source terminal 114S coupled to the ground rail 132.

The current source 103 includes a transistor 104 that passes a current to the voltage output terminal 118 when the voltage at the voltage output terminal 118 falls below a predetermined threshold voltage (e.g., the desired output voltage of the charge pump circuit 100). Thus, the transistor 104 increases the voltage at the voltage output terminal 118 when the voltage at the voltage output terminal 118 becomes more negative than the predetermined threshold voltage. The transistor 104 is a P-channel MOSFET in some implementations of the charge pump circuit 100. The transistor 104 includes a drain terminal 104D coupled to the voltage output terminal 118 and a source terminal 104S coupled to the power supply rail 120. The transistor 104 is controlled by the control circuit 106.

The error amplifier 108 compares (determines a difference of) the voltage at the voltage output terminal 118 to a reference voltage 128, and generates a difference signal 130 that is dependent on the difference in the voltage at the voltage output terminal 118 and the reference voltage 128. The error amplifier 108 includes an input terminal 108A coupled to the voltage output terminal 118 and an input terminal 108B coupled to the reference voltage source 126. The error amplifier 108 may include an operational transconductance amplifier in some implementations of the charge pump circuit 100.

The control circuit 106 controls the voltage inverter circuit 102 and the transistor 104 based on the difference signal 130 received from the error amplifier 108. The control circuit 106 includes an input terminal 106A coupled to an output terminal 108C of the error amplifier 108. In some implementations of the charge pump circuit 100, the control circuit 106 is a class AB control circuit or a class B control circuit. The control circuit 106 includes an output terminal 106B coupled to the gate terminal 104G of the transistor 104, and an output terminal 106C coupled to the gate terminal 114G of the transistor 114. When the difference signal 130 indicates that the voltage at the voltage output terminal 118 is greater than a voltage desired at the voltage output terminal 118, then the control circuit 106 enables the voltage inverter circuit 102 (by turning on the transistor 114) to lower the voltage at the voltage output terminal 118. When the difference signal 130 indicates that the voltage at the voltage output terminal 118 is less than a voltage desired at the voltage output terminal 118, then the control circuit 106 turns on the transistor 104 to increase the voltage at the voltage output terminal 118. Thus, if a circuit external to the charge pump circuit 100 causes the voltage at the voltage output terminal 118 to fall below the desired voltage at the voltage output terminal 118 (e.g., causes the voltage at the voltage output terminal 118 to fall below a threshold), then the control circuit 106 turns on the transistor 104 to source a current ($I_{CP}$) to the voltage output terminal 118 and increase the voltage at the voltage output terminal 118. Similarly, if the voltage at the voltage output terminal 118 is greater than the desired voltage (e.g., above a threshold), then the error amplifier 108 turns on the transistor 114 to lower the voltage at the voltage output terminal 118.

Figure 2:
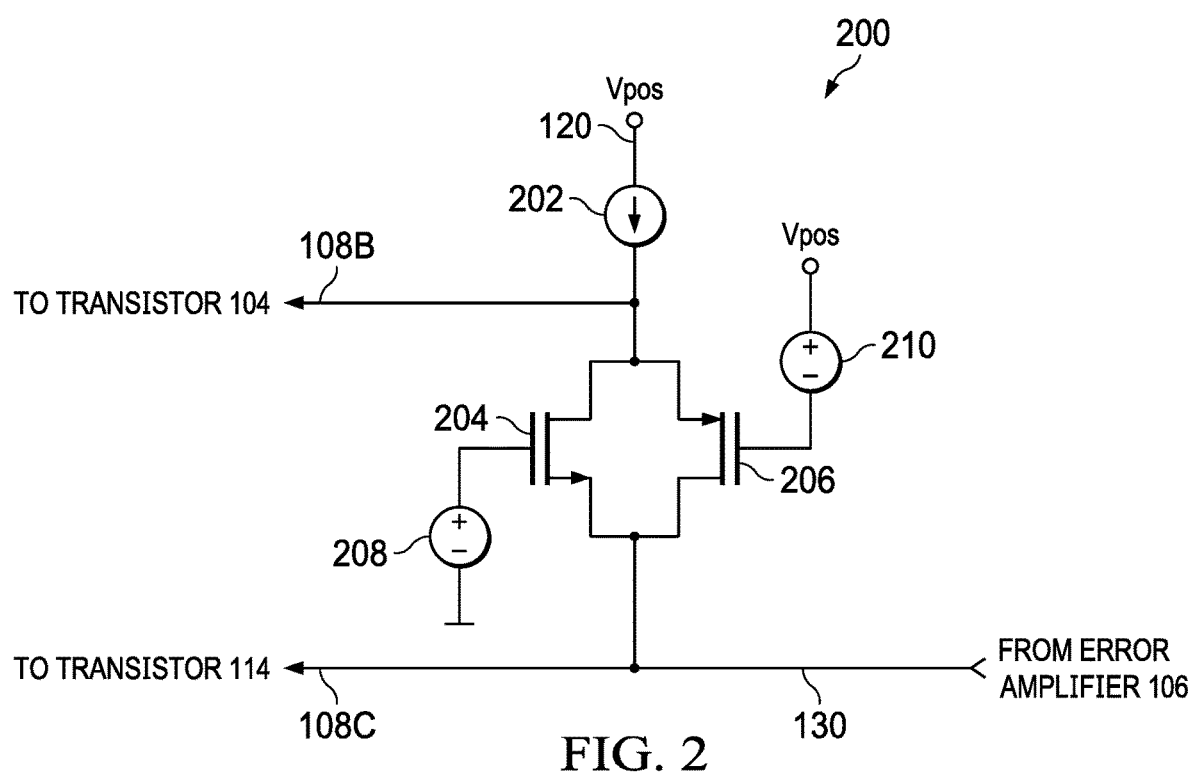
FIG. 2 shows a block diagram for an example control circuit suitable for use in a charge pump circuit in accordance with this description.

FIG. 2 shows a block diagram for an example control circuit 200 suitable for use in the charge pump circuit 100 in accordance with this description. The control circuit 200 is an implementation of the control circuit 106. The control circuit 200 is a Monticelli class AB control circuit. Some implementations of the control circuit 200 apply different control circuitry. The control circuit 200 includes a current source 202, a transistor 204, a transistor 206, a voltage source 208, and a voltage source 210. The transistors 204 and 206 are coupled to and control the transistors 104 and 114. The voltage source 208 sets a threshold for turning on the transistor 204 and, in turn, turning on the transistor 104, and at the same time, the minimum gate voltage for the transistor 114. As the difference signal 130 drops to level indicating that the voltage at the voltage output terminal 118 is below a desired voltage, the gate-source voltage of the transistor 204 is sufficient to turn on the transistor 204, thereby reducing the voltage at the gate terminal 104G of the transistor 104. The transistor 206 passes current to the difference signal 130 when the gate-source voltage of the transistor 206 is sufficient to turn on the transistor 206 (e.g., when the transistor 204 is turned off). The voltage source 210 sets the threshold for turning on the transistor 206, and at the same time, the maximum voltage at the gate of the transistor 104.

Figure 3:
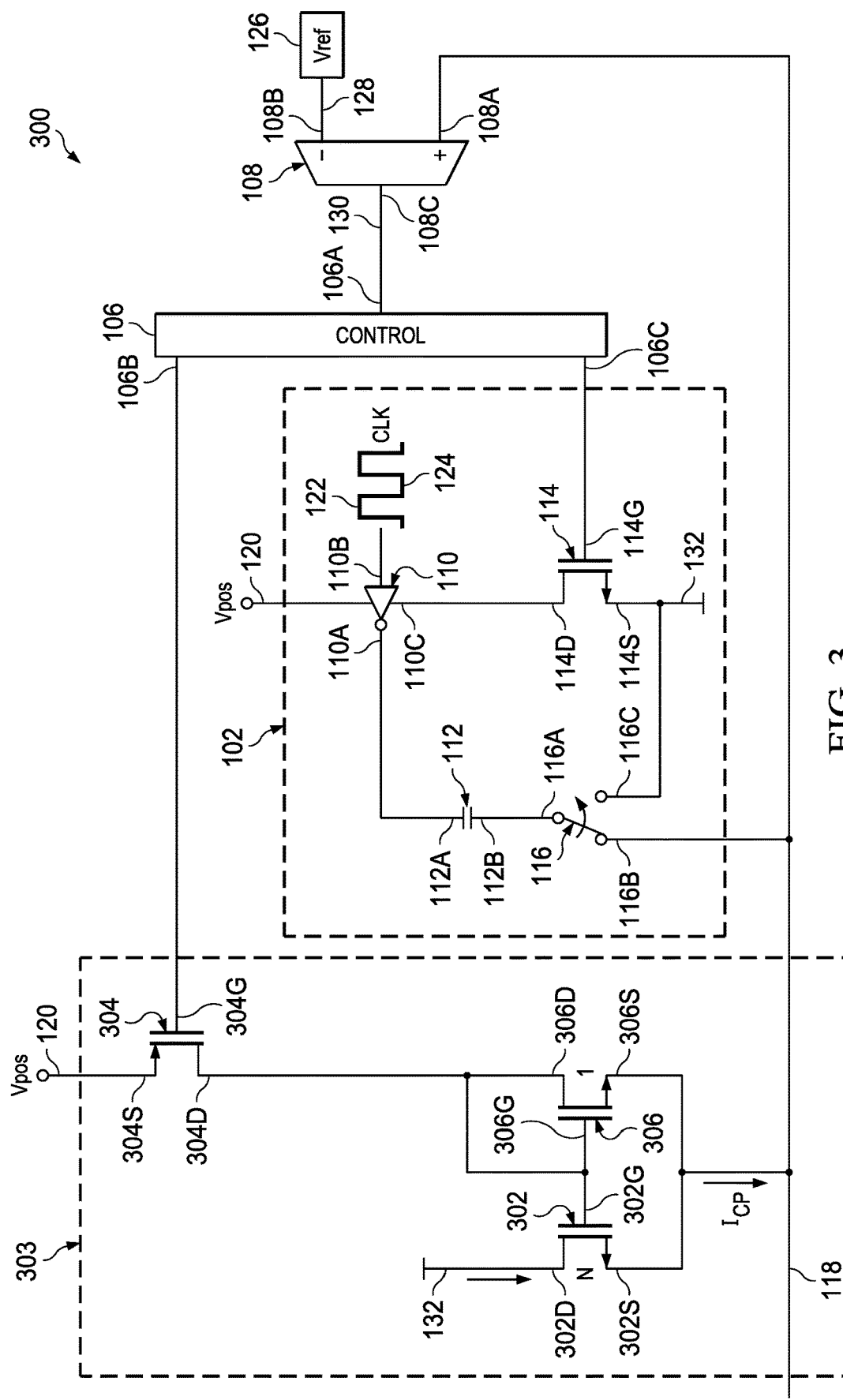
FIG. 3 shows a schematic diagram for another implementation of a charge pump circuit with undervoltage regulation in accordance with this description.

FIG. 3 shows a schematic diagram for an example charge pump circuit 300 with overvoltage regulation in accordance with this description. The charge pump circuit 300 is similar to the charge pump circuit 100, and replaces the current source 103 with current source 303. The charge pump circuit 300 includes a voltage inverter circuit 102, the current source 303, the control circuit 106, the error amplifier 108, and the voltage output terminal 118. The voltage inverter circuit 102 is coupled to the voltage output terminal 118 and the control circuit 106, and generates a negative voltage at the voltage output terminal 118 based on a positive voltage provided at the power supply rail 120. For example, if +3.3 volts is provided at the power supply rail 120, then the voltage inverter circuit 102 provides −3.3 volts (approximately) at the voltage output terminal 118.

Operation of the voltage inverter circuit 102, the control circuit 106, and the error amplifier 108 is explained with regard to the charge pump circuit 100. Some implementations of the control circuit 106 include the control circuit 200.

The current source 303 passes a current to the voltage output terminal 118 when the voltage at the voltage output terminal 118 falls below a predetermined threshold voltage (e.g., the desired output voltage of the charge pump circuit 300). The current source 303 includes a transistor 302, a transistor 304, and a transistor 306. The transistor 304 includes a source terminal 304S coupled to the power supply rail 120, a gate terminal 304G coupled to the output terminal 106B of the control circuit 106. When the control circuit 106 determines that the voltage at the voltage output terminal 118 is lower than the predetermined threshold voltage, the control circuit 106 activates the 304. The transistor 304 is a P-channel MOSFET in some implementations of the current source 303.

The transistor 302 and the transistor 306 form a current mirror. The transistor 306 is connected as a diode. The drain terminal 306D of the transistor 306 is coupled to the drain terminal 304D of the transistor 304 and to the gate terminal 306G of the transistor 306. A source terminal 306S of the transistor 302 is coupled to the voltage output terminal 118. The gate terminal 302G of the transistor 302 is coupled to the gate terminal 306G of the transistor 306, and the source terminal 302S of the transistor 302 is coupled to the voltage output terminal 118. The drain terminal 302D of the transistor 302 is coupled to the ground rail 332. The transistor 302 and the transistor 306 are scaled such that the transistor 306 is N times larger than the transistor 302 in some implementations of the current source 303. The transistor 302 and the transistor 306 are N-channel MOSFETs in some implementations of the current source 303.

When the control circuit 106 activates the transistor 304, current flows from the power supply rail through the transistor 304 and the transistor 306 to the voltage output terminal 118. Current flow through the transistor 306 activates the transistor 302, and N times the current flowing in the transistor 306 flows from the ground rail 332 through the transistor 302 to the voltage output terminal 118, thereby increasing the voltage on the voltage output terminal 118. By drawing current from ground, the current source 303 limits the power dissipated by the charge pump circuit 300, which is advantageous, for example, in battery powered implementations of the charge pump circuit 300.

In some implementations of the current source 303, a resistor replaces the transistor 306. For example, a first terminal of the resistor is coupled to the drain terminal 304D of the transistor 304 and the gate terminal 302G of the transistor 302, and a second terminal of the resistor is coupled to the voltage output terminal 118.

Figure 4:
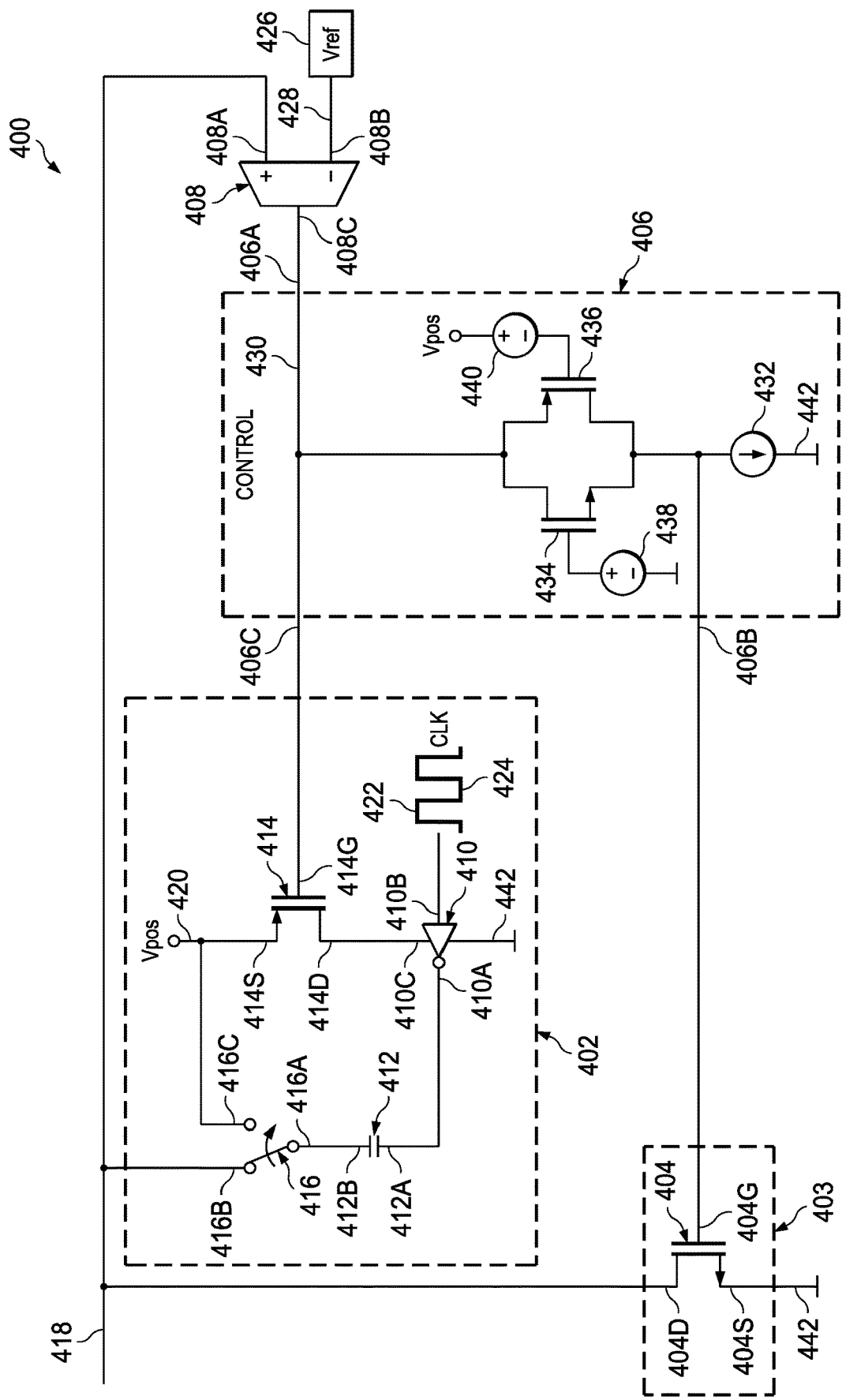
FIG. 4 shows a schematic diagram for an example charge pump circuit with overvoltage protection in accordance with this description.

FIG. 4 shows a schematic diagram for an example charge pump circuit 400 with overvoltage protection in accordance with this description. The charge pump circuit 400 includes a voltage doubler circuit 402, a current source 403, a control circuit 406, an error amplifier 408, and a voltage output terminal 418. The voltage doubler circuit 402 is coupled to the voltage output terminal 418 and the control circuit 406, and generates a positive voltage at the voltage output terminal 418 that is approximately double a positive voltage provided at the power supply rail 420. For example, if +3.3 volts is provided at the power supply rail 420, then the voltage doubler circuit 402 provides 6.6 volts (approximately) at the voltage output terminal 418.

The voltage doubler circuit 402 includes a driver circuit 410, a flying capacitor 412, a transistor 414, and a switch 416. An input terminal 410B of the driver circuit 410 is coupled to a clock source (e.g., an oscillator circuit), and an output terminal 410A of the driver circuit 410 is coupled to a terminal 412A of the flying capacitor 412.

The flying capacitor 412 is coupled to the voltage output terminal 418 and to the power supply rail 420 via the switch 416. The switch 416 includes a terminal 416A coupled to a terminal 412B of the flying capacitor 412, a terminal 416B coupled to the voltage output terminal 418, and a terminal 416C coupled to the power supply rail 420. The switch 416 may be implemented as two switches disposed in parallel. In the first part 422 of the clock cycle, the switch 416 connects the terminal 412B of the flying capacitor 412 to the power supply rail 420 for charging, and the driver 410 connects the terminal 412A of the capacitor 412 to ground. In the second part 424 of the clock cycle, the switch 416 connects the terminal 412B of the flying capacitor 412 to the voltage output terminal 418, and the driver 410 connects the terminal 412A of the capacitor 412 to the drain terminal 414D of the transistor 414.

The transistor 414 is coupled to the driver circuit 410 and the control circuit 406. The transistor 414 controls connection of the driver circuit 410 to the power supply rail 420, and thereby controls the charge transferred from the flying capacitor 412 to the voltage output terminal 418. For example, turning the transistor 414 on harder results in transfer of more charge from the flying capacitor 412 to the voltage output terminal 418. The transistor 414 is a P-channel metal oxide semiconductor field effect transistor (MOSFET) in some implementations of the charge pump circuit 400. The transistor 414 includes a drain terminal 414D coupled to a terminal 410C of the driver circuit 410, and a source terminal 414S coupled to the power supply rail 420.

The current source 403 includes a transistor 404 that sinks current from the voltage output terminal 418 when the voltage at the voltage output terminal 418 rises above a predetermined threshold voltage (e.g., the desired output voltage of the charge pump circuit 400). Thus, the transistor 404 decreases the voltage at the voltage output terminal 418 when the voltage at the voltage output terminal 418 becomes more positive than the predetermined threshold voltage. The transistor 404 is an N-channel MOSFET in some implementations of the charge pump circuit 400. The transistor 404 includes a drain terminal 404D coupled to the voltage output terminal 418 and a source terminal 404S coupled to the ground rail 442. The transistor 404 is controlled by the control circuit 406.

The error amplifier 408 compares (determines a difference of) the voltage at the voltage output terminal 418 to a reference voltage 428, and generates a difference signal 430 that is dependent on the difference in the voltage at the voltage output terminal 418 and the reference voltage 428. The error amplifier 408 includes an input terminal 408A coupled to the voltage output terminal 418 and an input terminal 408B coupled to the reference voltage source 426. The error amplifier 408 may include an operational transconductance amplifier in some implementations of the charge pump circuit 400.

The control circuit 406 controls the voltage inverter circuit 402 and the transistor 404 based on the difference signal 430 received from the error amplifier 408. The control circuit 406 includes an input terminal 406A coupled to an output terminal 408C of the error amplifier 408. In some implementations of the charge pump circuit 400, the control circuit 406 is a class AB control circuit or a class B control circuit. The control circuit 406 includes an output terminal 406B coupled to the gate terminal 404G of the transistor 404, and an output terminal 406C coupled to the gate terminal 414G of the transistor 414. When the difference signal 430 indicates that the voltage at the voltage output terminal 418 is less than a voltage desired at the voltage output terminal 118, then the control circuit 406 enables the voltage doubler circuit 402 (by turning on the transistor 414) to increase the voltage at the voltage output terminal 418. When the difference signal 430 indicates that the voltage at the voltage output terminal 418 is greater than a voltage desired at the voltage output terminal 418, then the control circuit 406 turns on the transistor 404 to decrease the voltage at the voltage output terminal 418. Thus, if a circuit external to the charge pump circuit 400 causes the voltage at the voltage output terminal 418 to rise above the desired voltage at the voltage output terminal 418 (e.g., causes the voltage at the voltage output terminal 418 to rise above a threshold), then the control circuit 406 turns on the transistor 404 to sink a current from the voltage output terminal 418 and decrease the voltage at the voltage output terminal 418. Similarly, if the voltage at the voltage output terminal 418 is less than the desired voltage (e.g., below a threshold), then the control circuit 406 turns on the transistor 414 to increase the voltage at the voltage output terminal 418.

The control circuit 406 includes a Monticelli class AB control circuit. Some implementations of the control circuit 406 apply different control circuitry. The control circuit 406 includes a current source 432, a transistor 434, a transistor 436, a voltage source 438, and a voltage source 440. The voltage source 438 sets a threshold for turning on the transistor 434, and the voltage source 440 sets a threshold for turning on the transistor 436. The transistors 434 and 436 are operate as a level shifter with respect to the gate terminals of the transistors 404 and 414. When output current of the error amplifier 408 increases (indicating that voltage at the voltage output terminal 418 exceeds the reference voltage 428), the voltage at the gate terminal 414G of the transistor 414 increases to turn off the transistor 414, and the voltage at the gate terminal 404G of the transistor 404 increases to turn on the transistor 404. When output current of the error amplifier 408 decreases (indicating that voltage at the voltage output terminal 418 is less than the reference voltage 428), the voltage at the gate terminal 414G of the transistor 414 decreases to turn on the transistor 414, and the voltage at the gate terminal 404G of the transistor 404 decreases to turn off the transistor 404.

Figure 5:
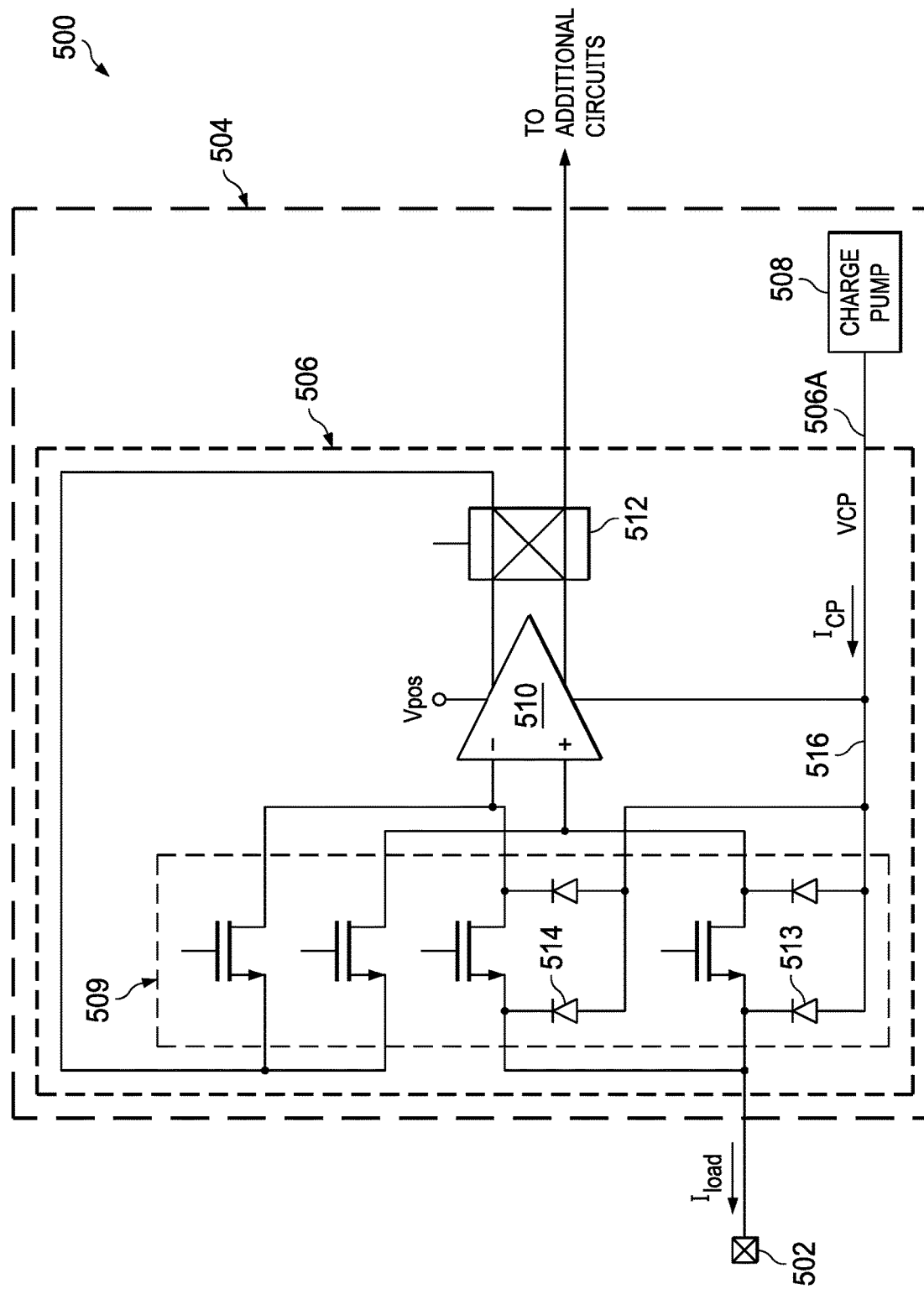
FIG. 5 shows an example electronic circuit that includes a charge pump circuit in accordance with this description.

FIG. 5 shows an example electronic circuit 500. The electronic circuit 500 includes an input terminal 502 and an analog front-end circuit 504 coupled to the input terminal 502. The analog front-end circuit 504 conditions a signal received at the input terminal 502 for further processing. For example, the analog front-end circuit 504 conditions a received signal for digitization by an analog-to-digital converter circuit coupled to an output of the analog front-end circuit 504 in some implementations of the electronic circuit 500. The analog front-end circuit 504 includes a chopper-stabilized circuit 506 and a charge pump circuit 508. The chopper-stabilized circuit 506 includes input switches 509, amplifier 510, and output switches 512. The input switches 509 modulate the input signal to reduce the effects of offset and drift in the amplifier 510. The output switches 512 demodulate the output of the amplifier 510.

The charge pump circuit 508 generates a negative voltage for powering the amplifier 510. The charge pump circuit 508 is an implementation of the charge pump circuit 100. The voltage output terminal of the charge pump circuit 508 is coupled to an input terminal 506A of the chopper circuit 506. The charge pump circuit 508 is coupled to the input terminal 502 via the body diodes 513 and 514. External circuitry coupled to the input terminal 502 may sink current sufficient to pull the voltage 516 below the desired output voltage of the charge pump circuit 508. For example, if the desired output voltage of the charge pump circuit 508 is −3.0 volts, and circuitry external to the electronic circuit 500 pulls current through the diodes 513 and 514, then the voltage 516 may be pulled below −3.0 volts. The excessively low voltage may damage the amplifier 510 and/or the charge pump circuit 508. The charge pump circuit 508 monitors the voltage 516 and if the voltage 516 drops below a predetermined threshold voltage (e.g., <−3.3 volts), then the charge pump circuit 508 sources current (through the transistor 104) to pull the voltage 516 up to −3.0 volts. Thus, the charge pump circuit 508 is capable of both sinking and sourcing current to regulate the voltage 516.

Modifications are possible in the described embodiments, and other embodiments are possible, within the scope of the claims.

What is claimed is:

1. A charge pump circuit having an output, the charge pump circuit comprising:
   a first circuit coupled to the output, the first circuit including:
      a first transistor having a first control input; and
      second and third transistors arranged as a current mirror coupled to the first transistor and to the output of the charge pump circuit
   a second circuit including:
      a capacitor;
      a fourth transistor having a second control input; and
      a switch coupled to the capacitor, the fourth transistor, and the output;
   a control circuit having an input, a first control output coupled to the first control input, and a second control output coupled to the second control input; and
   an error amplifier having an amplifier input coupled to the output of the charge pump circuit and having an amplifier output coupled to the input of the control circuit.

2. The charge pump circuit of claim 1, wherein:
   the first transistor has a transistor terminal coupled to the output of the charge pump circuit; and
   the first and fourth transistors are field-effect transistors.

3. The charge pump circuit of claim 2, wherein the first transistor is a p-channel metal-oxide semiconductor field-effect transistor (MOSFET), and the fourth transistor is an n-channel MOSFET.

4. The charge pump circuit of claim 2, wherein the first transistor is an n-channel metal-oxide semiconductor field-effect transistor (MOSFET), and the fourth transistor is a p-channel MOSFET.

5. The charge pump circuit of claim 1, wherein the first transistor is a p-channel metal-oxide semiconductor field-effect transistor (MOSFET), and the second, third, and fourth transistors are n-channel MOSFETs.

6. The charge pump circuit of claim 1, wherein:
   the capacitor has first and second capacitor terminals;
   the fourth transistor has first and second transistor terminals;
   the switch is coupled to the first capacitor terminal and the first transistor terminal; and
   the second circuit further includes a driver circuit coupled to the second capacitor terminal and the second transistor terminal.

7. The charge pump circuit of claim 1, wherein the control circuit is a class AB control circuit or a class B control circuit.

8. A charge pump having an output, the charge pump circuit comprising:
   a first circuit coupled to the output and including a first transistor having a first control input;
   a second circuit including:
      a capacitor;
      a second transistor having a second control input; and
      a switch coupled to the capacitor, the second transistor, and the output;
   a control circuit having an input, a first control output coupled to the first control input, and a second control output coupled to the second control input, the control circuit is a Monticelli class AB control circuit including:
      a current source having a current source terminal coupled to the first control input; and
      third and fourth transistors each having a respective first transistor terminal and a respective second transistor terminal, the first transistor terminals are coupled to the current source terminal and the first control input and the second transistor terminals are coupled to the second control input; and
   an error amplifier having an amplifier input coupled to the output of the charge pump circuit and having an amplifier output coupled to the input of the control circuit.

9. An analog front-end circuit comprising:
   a chopper circuit; and
   a charge pump circuit having an output coupled to the chopper circuit, the charge pump circuit including:
      a first circuit coupled to the output and including:
         a first field-effect transistor (FET) having a first gate; and
         second and third FETs arranged as a current mirror coupled to the first FET and to the output of the charge pump circuit
      a second circuit including:
         a capacitor;
         a fourth FET having a second gate; and
         a switch coupled to the capacitor, the fourth FET, and the output;
      a control circuit having an input, a first control output coupled to the first gate, and a second control output coupled to the second gate; and
      an error amplifier having an amplifier input coupled to the output of the charge pump circuit and having an amplifier output coupled to the input of the control circuit.

10. The analog front-end circuit of claim 9, wherein the first FET has a transistor terminal coupled to the output of the charge pump.

11. The analog front-end circuit of claim 10, wherein the first FET is a p-channel metal-oxide semiconductor field-effect transistor (MOSFET), and the fourth FET is an n-channel MOSFET.

12. The analog front-end circuit of claim 10, wherein the first FET is an n-channel metal-oxide semiconductor field-effect transistor (MOSFET), and the fourth FET is a p-channel MOSFET.

13. The analog front-end circuit of claim 9, wherein: the first FET is a p-channel metal-oxide semiconductor field-effect transistor (MOSFET), and the second, third, and fourth FETs are n-channel MOSFETs.

14. An analog front-end circuit comprising:
   a chopper circuit; and
   a charge pump circuit having an output coupled to the chopper circuit, the charge pump circuit including:
      a first circuit coupled to the output and including a first field-effect transistor (FET) having a first gate;
      a second circuit including:
         a capacitor;
         a second FET having a second gate; and
         a switch coupled to the capacitor, the second FET, and the output;
      a control circuit having an input, a first control output coupled to the first gate, and a second control output coupled to the second gate, the control circuit is a Monticelli class AB control circuit including:
         a current source having a current source terminal coupled to the first gate; and
         third and fourth FETs each having a respective first transistor terminal and a respective second transistor terminal, the first transistor terminals are coupled to the current source terminal and the first gate, and the second transistor terminals are coupled to the second gate; and
      an error amplifier having an amplifier input coupled to the output of the charge pump circuit and having an amplifier output coupled to the input of the control circuit.

15. A charge pump circuit having an output, the charge pump circuit comprising:
   a first circuit coupled to the output and including a first field-effect transistor (FET) having a first gate, and second and third FETs arranged as a current mirror coupled to the first FET and to the output of the charge pump circuit;
   a second circuit including:
      a capacitor;
      a fourth FET having a second gate; and
      a switch coupled to the capacitor, the fourth FET, and the output; and
   a control circuit having an input, a first control output coupled to the first gate, and a second control output coupled to the second gate, wherein the control circuit is configured to:
      provide a first control signal at the first gate responsive to receiving a first input signal at its input indicating a voltage at the output of the charge pump circuit is below a voltage threshold; and
      provide a second control signal at the second gate responsive to receiving a second input signal at its input indicating the voltage at the output of the charge pump circuit exceeds the voltage threshold.

16. The charge pump circuit of claim 15, further comprising:
   an error amplifier having an amplifier input coupled to the output of the charge pump circuit and having an amplifier output coupled to the input of the control circuit, wherein the error amplifier is configured to:
      compare the voltage at the output of the charge pump circuit to the voltage threshold; and
      provide the first control signal or the second control signal responsive to the comparison.

17. The charge pump circuit of claim 15, wherein the first FET has a transistor terminal coupled to the output of the charge pump.

18. The charge pump circuit of claim 17, wherein the first FET is a p-channel metal-oxide semiconductor field-effect transistor (MOSFET), and the fourth FET is an n-channel MOSFET.

19. The charge pump circuit of claim 17, wherein the first FET is an n-channel metal-oxide semiconductor field-effect transistor (MOSFET), and the fourth FET is a p-channel MOSFET.

20. The charge pump circuit of claim 15, wherein the first FET is a p-channel metal-oxide semiconductor field-effect transistor (MOSFET), and the second, third, and fourth FETs are n-channel MOSFETs.

21. A charge pump circuit having an output, the charge pump circuit comprising:
- a first circuit coupled to the output and including a first field-effect transistor (FET) having a first gate;
- a second circuit including:
  - a capacitor;
  - a second FET having a second gate; and
  - a switch coupled to the capacitor, the second FET, and the output; and
- a control circuit having an input, a first control output coupled to the first gate, and a second control output coupled to the second gate, the control circuit configured to:
  - provide a first control signal at the first gate responsive to receiving a first input signal at its input indicating a voltage at the output of the charge pump circuit is below a voltage threshold; and
  - provide a second control signal at the second gate responsive to receiving a second input signal at its input indicating the voltage at the output of the charge pump circuit exceeds the voltage threshold; and
- the control circuit is a Monticelli class AB control circuit including:
  - a current source having a current source terminal coupled to the first gate; and
  - third and fourth FETs each having a respective first transistor terminal and a respective second transistor terminal,
  - the first transistor terminals are coupled to the current source terminal and the first gate, and
  - the second transistor terminals are coupled to the second gate.

22. The charge pump circuit of claim 21, further comprising:
- an error amplifier having an amplifier input coupled to the output of the charge pump circuit and having an amplifier output coupled to the input of the control circuit, wherein the error amplifier is configured to:
- compare the voltage at the output of the charge pump circuit to the voltage threshold; and
- provide the first control signal or the second control signal responsive to the comparison.

* * * * *